H. A. TEASDALE.
FLYTRAP.
APPLICATION FILED APR. 13, 1918.
1,361,417.
Patented Dec. 7, 1920.
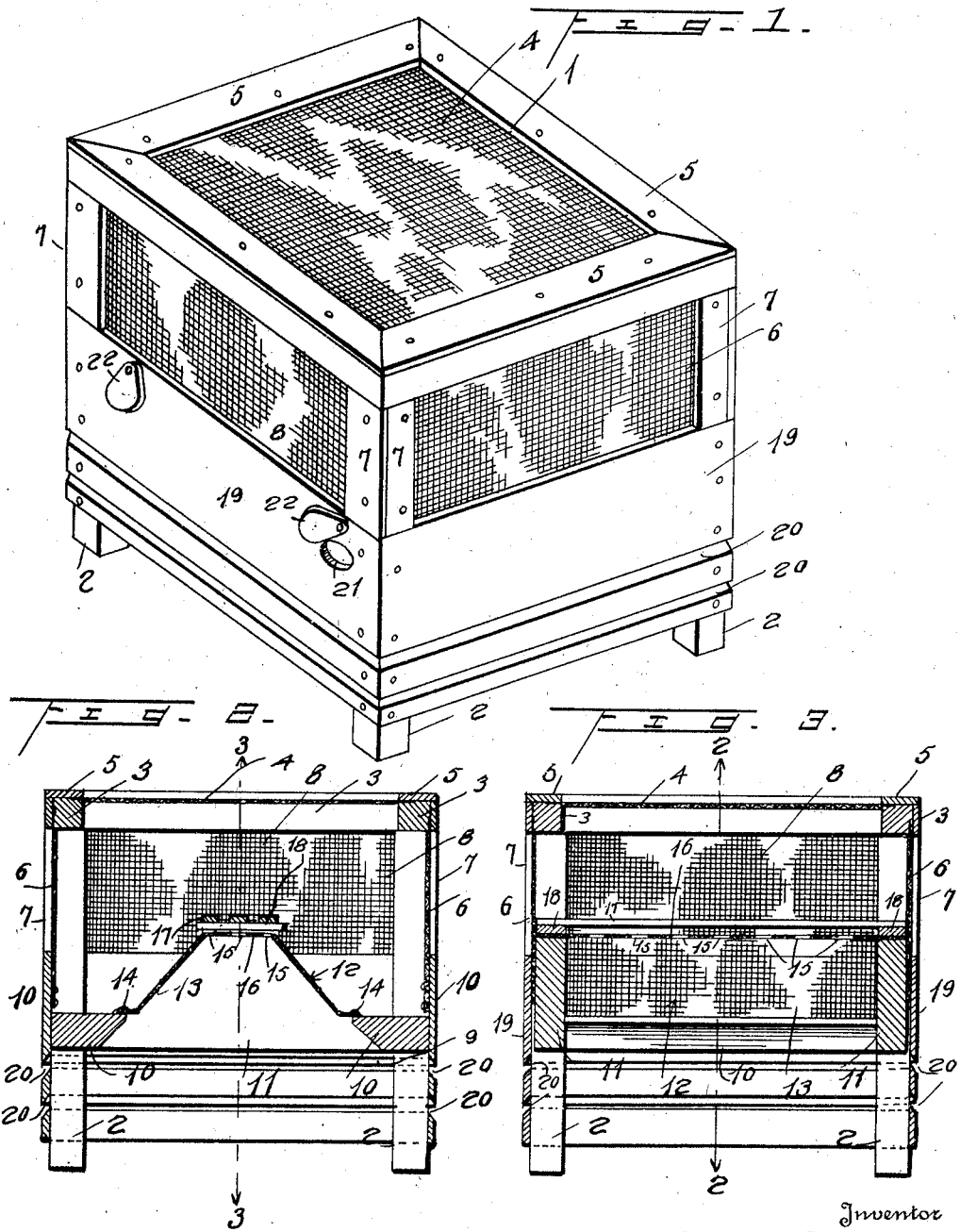

UNITED STATES PATENT OFFICE.

HENRY A. TEASDALE, OF ATLANTA, GEORGIA.

FLYTRAP.

1,361,417.     Specification of Letters Patent.     Patented Dec. 7, 1920.

Application filed April 13, 1918. Serial No. 228,410.

*To all whom it may concern:*

Be it known that I, HENRY A. TEASDALE, a citizen of United States, residing at Atlanta, in the county of Fulton and State of Georgia, have invented certain new and useful Improvements in Flytraps; and I do hereby declare the following to be a full, clear, and exact description of the invention, such as will enable others skilled in the art to which it appertains to make and use the same.

This invention relates to fly traps and the primary object of the invention is to provide an improved trap, which includes a plurality of upwardly and inwardly inclined slots in the side walls thereof, so as to form an additional means for the flies to enter the trap, besides the ordinary entrance underneath the trap so as to catch the flies alighting on the side walls of the trap.

Another object of the invention is to provide an improved fly trap, which consists of an upper trap section formed of foraminous material so that the light can readily enter the trap to attract the flies into the same, and a lower trap section including the upwardly inclined side walls extending across the upper section and provided with a plurality of openings in the upper portion thereof, so as to allow the flies to enter into the body of the trap.

A further object of the invention is to provide an improved trap consisting of an upper closed section, an inwardly inclined lower section having a plurality of apertures therein for allowing the flies to enter the upper section, and having a plurality of spaced bars extending across the trap and overlying the openings, so as to prevent the flies from crawling out through the openings, after the same have entered the trap proper.

A still further object of the invention is to provide an improved trap of the above character, which is durable and efficient in use, one that is simple and easy to construct, and one that can be placed upon the market at a reasonable cost.

With these and other objects in view the invention consists in the novel construction, arrangement and formation of parts as will be hereinafter more specifically described, and claimed below and illustrated in the accompanying drawings form a part of this specification in which:

Figure 1 is a detail perspective view of the improved trap,

Fig. 2 is a detail cross section taken on the line 2—2 of Fig. 3,

Fig. 3 is a detail cross section taken on the line 3—3 of Fig. 2.

Referring to the drawings in detail wherein similar reference numerals designate corresponding parts throughout the several views, the numeral 1 generally indicates the improved fly trap, which is of rectangular formation, having the corner posts 2, which are fastened together at their upper ends by horizontal side pieces 3. An upper wall 4 is formed of wire or the like and is held in position by strips 5, which are nailed or otherwise secured in position. The wire side walls 6 are secured to posts 2 by suitable vertical strips 7, which are secured in position by any suitable means. The trap 1 is divided into an upper section 8 and a lower section 9, by inwardly extending cross pieces 10 which have their ends secured to triangular end pieces 11. A suitable wire screen 12 having inclined upwardly extending side walls 13 is secured to the inner edge of the cross pieces 10 as at 14 and the wire member 12 has the upper wall thereof 15 provided with a plurality of spaced apertures 16, through which the flies are adapted to go to enter the section 8. To prevent the flies from leaving the section 8 through the apertures 16 a plurality of spaced bars 17 are extended across the trap and have their terminals secured to end pieces 18 which are secured to the upper end of the triangular shaped member 11 and these strips 17 are arranged to overlie the openings and thus prevent the flies from crawling out through the openings 16. The lower section 9 of the trap and a portion of the upper section are closed by opaque side walls 19, which are spaced from the bottom of the posts 2 and thus flies crawling under the side walls 19 will be attracted by the light entering the foraminous upper wall 4 and upper side walls 6 and will fly up into section 8 through the openings 16. Inasmuch as flies are attracted by light, the flies in the upper chamber will not try to crawl back through the openings 16, as the strips 17 effectively prevent the light from shining therethrough.

The upper walls of the side walls 19 are provided adjacent the lower ends thereof with a plurality of spaced upwardly and inwardly directed slots 20 through which the flies are adapted to crawl. It will be seen that when the flies alight on the side walls 19 the same will be attracted by the light from the slots 20 and the same will crawl up the walls of the slot and into the trap.

From the foregoing description it can be seen that an improved fly trap is provided, in which the entrance of flies through the body of the trap is facilitated by the provision of a plurality of upwardly and inwardly extending slots, formed in the side walls thereof, and in which the exit of the flies is hampered by a plurality of strips which overlie the exit opening of the trap.

One of the side walls of the trap is provided with enlarged openings 21 which communicate with the upper trap section 8 on each side of the inclined walls 13 of the wire member 12 and these openings form means whereby the dead flies can be readily shaken out of the trap body. Suitable closures 22 are provided for the openings so as to normally close the same.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages as set forth.

What I claim as new is:

A fly trap comprising an upper foraminous section and a lower opaque section, an upwardly extending wire mesh member positioned in the lower section and having a plurality of openings formed therein, the lower section having a plurality of spaced inclined upwardly and inwardly extending slots formed in the side and end walls adjacent to the lower edge thereof, and a plurality of spaced strips arranged in the upper foraminous section and disposed over the openings in the wire mesh member and spaced therefrom and arranged to form means for holding bait, and for effectively darkening said openings, as and for the purpose specified.

In testimony whereof I affix my signature in presence of two witnesses.

HENRY A. TEASDALE.

Witnesses:
 HENRY P. HOLLINGSWORTH,
 JAMES L. JORDAN.